US008239823B2

(12) United States Patent
Stenberg et al.

(10) Patent No.: US 8,239,823 B2
(45) Date of Patent: Aug. 7, 2012

(54) GENERATING LIBRARIES FOR REFLECTION WITHOUT PROJECT COMPILATION

(75) Inventors: Per Johan Stenberg, Redmond, WA (US); Bijoy Bordoloi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 12/408,329

(22) Filed: Mar. 20, 2009

(65) Prior Publication Data

US 2010/0242015 A1    Sep. 23, 2010

(51) Int. Cl.
*G06F 9/44* (2006.01)
(52) U.S. Cl. ........................................ 717/106
(58) Field of Classification Search .................. None
See application file for complete search history.

(56) References Cited

U.S. PATENT DOCUMENTS

| | | | |
|---|---|---|---|
| 6,604,110 B1 | 8/2003 | Savage et al. | |
| 6,701,381 B2 | 3/2004 | Hearne et al. | |
| 7,240,340 B2* | 7/2007 | Vaidyanathan et al. | 717/143 |
| 7,246,134 B1 | 7/2007 | Kitain et al. | |
| 7,263,686 B2 | 8/2007 | Sadiq | |
| 2003/0083900 A1 | 5/2003 | Khriss et al. | |
| 2006/0129605 A1 | 6/2006 | Doshi | |
| 2007/0038977 A1 | 2/2007 | Savage | |
| 2007/0226682 A1 | 9/2007 | Kilgore et al. | |
| 2008/0250313 A1 | 10/2008 | Kamdar et al. | |

OTHER PUBLICATIONS

Kathleen Dollard 'Extracting Metadata—ASP Free' (Apress 2004; http://www.aspfree.com/c/a/Database/Extracting-Metadata/).*
Oplinger< Jeffrey Thomas., "Enhancing Software Reliability with Speculative Threads", A dissertation submitted for the degree of Doctor of Philosophy, Stanford University, retrieved at <<http://suitstanford.edu/papers/oplinger-thesis.pdf>>, Aug. 2004, pp. 1-125.
"Sourceforge", "m80", retrieved at <<http://sourceforge.net/projects/m80/>>, Dec. 18, 2006, p. 1.
Banker, et al., "Software Development Practices, Software Complexity, and Software Maintenance Performance: A Field Study", Management Science, retrieved at <<http://portal.acm.org/citation.cfm?id=291329.291332&coll=GUIDE&dl=GUIDE&CFID=9942433&CFTOKEN=19510564>>, vol. 44, No. 4, Apr. 1998, pp. 433-450.

* cited by examiner

*Primary Examiner* — Don Wong
*Assistant Examiner* — Deric Ortiz
(74) *Attorney, Agent, or Firm* — Chin IP, PLLC; David Chin (57) ABSTRACT

A stripped-down version of a library is generated from server source code extracted from a server project under development. Information extracted from the server source code may include only that information which is exposed to a client project under development. The stripped-down library generated from the extracted server source code is received by a reflection-based component that uses reflection to generate documentation and disclosure information helpful in the development of the client source code. Because the server project does not have to be compiled or ready to be compiled before the software development information for the client project can be provided, development of the server side source code and the client side source code can proceed in tandem or incrementally.

20 Claims, 5 Drawing Sheets

PRIOR ART

PRIOR ART

GENERATING LIBRARIES FOR REFLECTION WITHOUT PROJECT COMPILATION

BACKGROUND

A programming or software development tool is a program or application used by software developers to create, debug, maintain, or otherwise support other programs and applications. Programming tools can be integrated into an IDE (integrated development environment) that consolidates functionality into one place or can be used by external software as exemplified by the use of Unix shell tools with text editors like Vim and Emacs. Programming tools can be interactive or can be static. Interactive programming tools provide information to a program developer as the developer is writing the program while static programming tools run offline and provide information to the developer after the fact. One popular type of interactive programming tool provides dynamic documentation and disambiguation information such as: a list of members for a class, a list of parameters for a function, a list of defined classes, a list of types for type declarations and so on. Dynamic documentation and disambiguation information is displayed in response to information received from the developer. An example of such a dynamic display is, in response to a developer typing in the name of a method, a list of valid parameters for the method is displayed.

SUMMARY

Relevant source code can be extracted from server source code and converted into a library of program code that can be used by reflection-based development tools to provide dynamic documentation and disambiguation information without having to first successfully perform a build on the server source code. The library generated from the extracted server source code can be a metadata assembly or other assembly, a DLL (dynamic link library) a package or other software library entity. The generated library can be used by reflection-based programming tools without prior compilation of the source code from which the library is generated. The relevant source code extracted from the server-side source code can be metadata associated with types and type definitions referenced in the server-side source code. The extracted source code can be converted into a library. The library can be provided to a reflection-based code generator, which can generate documentation and disambiguation information to a client-side source code editor, the client-side source code editor providing the documentation and disambiguation information to the developer as the developer is writing the client-side source code. Hence, incremental development of the server-side and client-side software can proceed in the absence of a server project compile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Many programming tools work by compiling source code to generate a binary program code file (sometimes in the form of Common Intermediate Language (CIL) or Java bytecode) and then reverse engineering the binary program code file to produce documentation and disambiguation information that is helpful when developing software. For example, in the realm of network communication, a programmer may want to expose an API (application programming interface) on a server over a network to a client. In this context, an API can be a set of methods or can be a set of classes where each class in the set of classes is associated with a set of methods, properties and fields. It may be helpful to have an automated way to create a proxy that can access the server API programmatically, while listing a corresponding proxy API for the developer to use on the client side.

Today one automated way in which source code to expose a server API or set of server APIs is generated is by compiling the server code, and performing reflection on the built output. During reflection, the API or set of APIs that are exposed to the client are found and proxy APIs are programmatically generated for the APIs exposed to the client. In some programming languages, source code including proxy classes that expose an API of interest to the client are generated from the information gleaned from reflection performed on the binary program code file. This approach relies on having the binary program code file available. This in turn depends on being able to successfully compile the server source code to produce the binary program code file. Compilation, especially when invoked while a developer is using an interactive programming tool such as a source code editor, can result in an unacceptable time delay. Moreover, the server software obviously has to be in a compile-able state to be compiled: that is, the server software has to be complete enough and free enough of errors to be successfully compiled.

Often, because client-side software and server-side software is developed in tandem or incrementally, (that is, development of the client-side software begins before development of the server-side software is complete so that perhaps the developer writes some server source code, then writes some client source code, then writes some more server source code and so on), the server-side software is not in a compile-able state when the client-side software is being developed because the server-side software is also in development. Finally, although the server-side source code may be able to be compiled successfully, it may be advisable not to compile the server-side source code because the server-side source code is changing, is expected to change or for other reasons such as but not limited to performance.

To address these and other aspects of programming tools, in accordance with aspects of the subject matter discussed herein, relevant information (such as but not restricted to metadata associated with program entities (e.g., functions, methods, types, classes, fields, properties, variables etc.) that will be exposed to a client by a server), can be extracted from source code in a server project. Information that is extracted from the source code can be found in various ways, depending on the problem domain, but in general, language constructs are evaluated to find the relevant information. A stripped-down version of a library such as but not limited to a metadata assembly can be generated from the extracted information without compiling the project from which the information is extracted. In accordance with some aspects of the subject matter the stripped down library can include metadata and can exclude portions of the executable part of a compilation product. For example, libraries can be executables with empty method bodies. Moreover, excluded information can include private code (i.e., extracted information is information that is public code). Information that is filtered out of the extracted information or that is excluded from the information that is extracted can include everything except the information that is exposed to a client by a server so that a stripped-down library that excludes information that will not be exposed to the client, can be sent to a code generator or other reflection-based component. Because only a subset of information in the server project is used to create the library, the server source code can be in a much less complete state when this process is performed. The subset of information extracted from the server source code is less likely to contain errors than is the entire server project.

Source code can be generated by the code generator or other reflection-based component from the extracted and/or extracted and filtered information. Information associated with the code-generated source code or with the original server source code can be provided to the developer during development of the client project before the server project is complete or in a state in which it will successfully compile. For example, if the application being developed is a network application involving a server and a client, information concerning APIs exposed to the client can be extracted from the server source code as soon as an API that will be exposed to the client is added to the server source code.

A library such as but not limited to a metadata assembly can be generated therefrom, and API proxy source code can be generated by the code generator from the stripped down library. In accordance with some aspects of the subject matter disclosed herein, the API proxy source code can be based on types defined in the library generated from extracted server source code containing proxy classes that expose the API to the client. Information generated in this way can be displayed to the developer to assist the client-side software development process. For example, if a set of APIs that will be exposed to the client are extracted from the server source code, the code generator can generate the source code that represents the set of proxy APIs, enabling the set of APIs that will be exposed to the client to be displayed to the developer, while he or she is coding the client source code for the application, even if the server side project is not complete or contains errors that prevent successful compilation of the server side project.

Generating Libraries for Reflection without Project Compilation

Figure 1A:
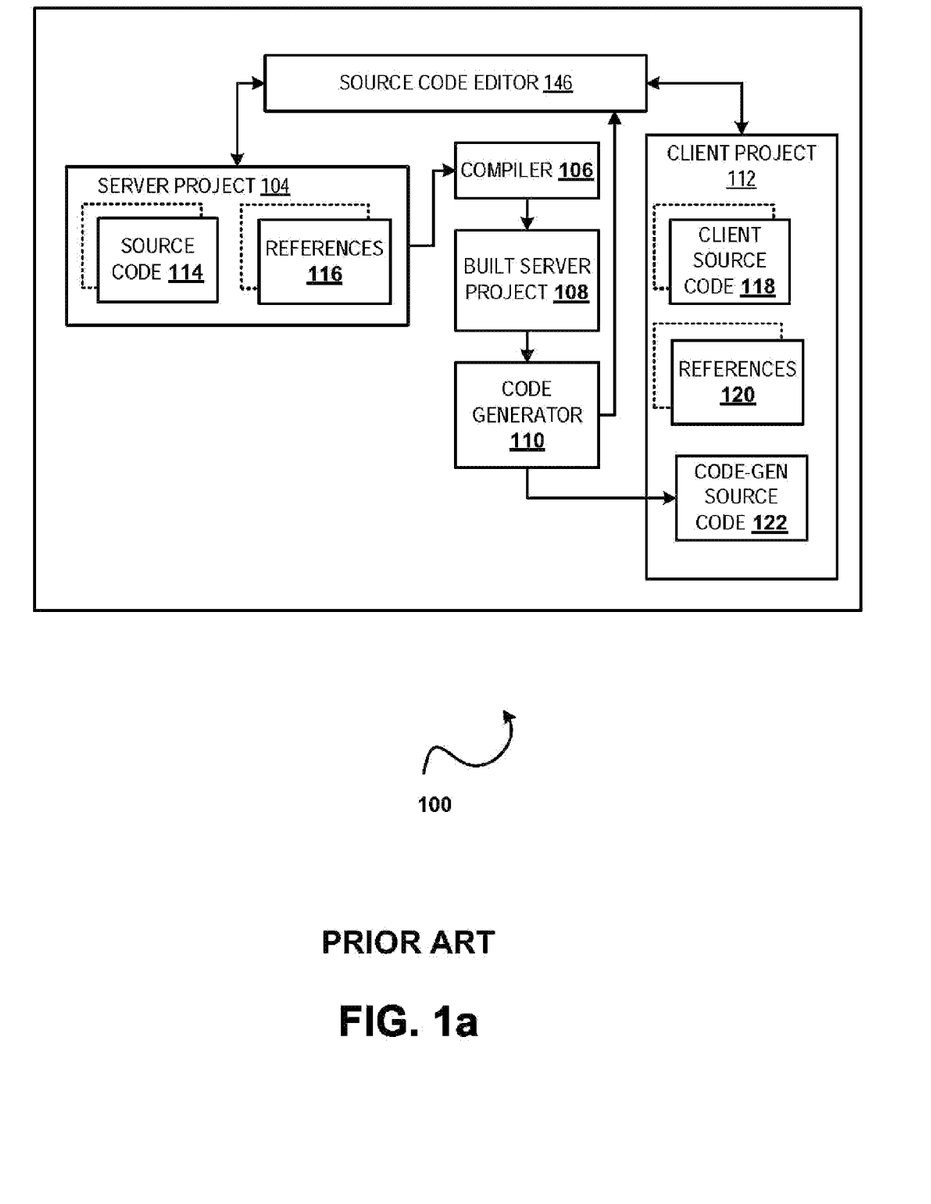
FIG. 1a is a block diagram of a software development system as is known in the art.

FIG. 1a illustrates an example of a known system 100 for software development and can include the following: a source code editor 146, a server project 104, a compiler 106, a built server project 108, a code generator 110 or other reflection-based component and a client project 112. An application can include a number of projects, including both server projects and client projects. A project can include compilation settings, source code, other project artifacts and library references. The server project 104 can include server source code 114 and references 116. The client project 112 can include client source code 118, references 120 and source code generated by the code generator, code-generated source code 122. References 116 can include pre-built binary references used or referenced by the server source code 114. References 120 can include pre-built binary references used or referenced by the client source code 118. Source code such as server source code 114 and client source code 118 is generally entered via a source code editor such as source code editor 146.

Source code editor 146 may receive documentation and disambiguation information generated from the built server project 108 to assist the developer in his or her development tasks, as described above. The built server project 108 can comprise binary program code such as but not limited to assemblies comprising metadata and executables in CIL. The code generator 110 can receive or access the binary program code generated by the compiler 106 and generate from it information such as documentation and disambiguation information that when displayed to the developer helps the developer in his development tasks.

Today, when a software developer writes or adds to software that will run on a network, he or she typically creates both server source code and client source code in a source code editor such as source code editor 146. For example, suppose the developer is writing part of an application for online shopping. Suppose the developer is adding a new way to search for merchandise or a new way to search for a particular type of merchandise to the online shopping application. Code added to the server source code might include the mechanism for executing the new search and can indicate that the new search method is to be exposed to the client. Code added to the client source code might include a new textbox in which a string to be searched for is entered and that calls the new search method.

Today, in order to provide information such as auto-completion information, programmatically generated proxy source code and other documentation and disambiguation information useful to the software developer when writing the client source code, the server source code has to be complete enough to compile successfully because the code generator 110 uses the binary program code from the built server project 108 generated by the compiler 106 from the server source code 114 to create the information that is presented to the software developer during development of the client software. For example, before the development software can list the new search method as one of the methods exposed by the server to the client, the server source code for the new search method has to be complete enough and debugged enough to compile. Typically, however, a software developer would like to be able to develop the server source code and the client source code in tandem. (That is, the developer may want to write a little server source code and then write a little client source code, and then go back to writing a little more server source code and so on.) In order to receive dynamic documentation and disambiguation information in the client-side source code development, the server-side software has to have been compiled.

Figure 1B:
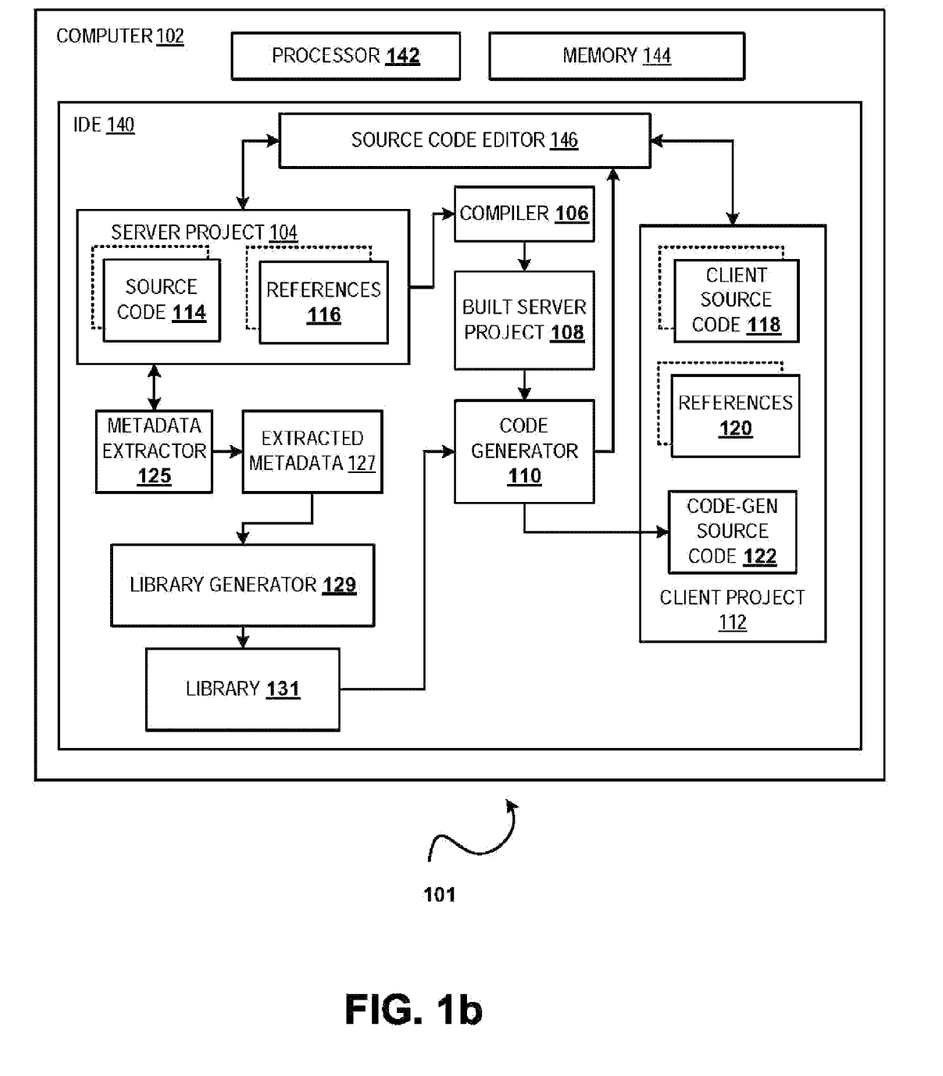
FIG. 1b is a block diagram of an example of a system for generating libraries in the absence of project compilation in accordance with aspects of the subject matter disclosed herein.

FIG. 1b illustrates an example of a system 101 that generates one or more libraries for reflection in accordance with aspects of the subject matter disclosed herein. All or portions of system 101 may reside on one or more computers such as the computers described below with respect to FIG. 3. All or portions of system 101 may reside on one or more software development computers (e.g., computer 102) such as the computers described below with respect to FIG. 4. The system 101 or portions thereof may comprise a portion of an integrated development environment 140 (IDE) such as the ones described and illustrated below with respect to FIG. 4. Alternatively, system 101 or portions thereof may be provided as a stand-alone system or as a plug-in.

System 101 may include one or more processors (such as processor 142), a memory 144, a source code editor 146, a server project 104, a compiler 106, a built server project 108, a code generator 110 or other reflection-based component and a client project 112. An application can include a number of projects, including both server projects and client projects. Server-side software can be generated from server project(s) by compilation and client-side software can be generated from the client project(s) by compilation. A project can include compilation settings, source code, other project artifacts and assembly references. The server project 104 can include server source code 114 and references 116. The client project 112 can include client source code 118 and references 120. References 116 can include pre-built binary references used or referenced by the server source code 114. References 120 can include pre-built binary references used or referenced by the client source code 118.

Source code such as server source code 114 and client source code 118 is generally entered via a source code editor such as source code editor 146. Source code editor 146 may dynamically receive documentation and disambiguation information generated from the built server project 108 to assist the developer in his or her development tasks, as described above. The built server project 108 can comprise binary program code such as but not limited to CIL that includes metadata and executables. The code generator 110 can receive or access the binary program code of the built server project 108 generated by the compiler 106 and generate from it code-generated source code 122 for the client project 112 and information that when displayed to the developer helps the developer in his development tasks. This information may include documentation and disambiguation information as described above.

A compiler 106 may compile source code written in Visual Basic, Visual J#, C++, C#, J#, Java Script, APL, COBOL, Pascal, Eiffel, Haskell, ML, Oberon, Perl, Python, Scheme, Smalltalk or another programming language. A compiler such as compiler 106 can receive source code input and can produce executable code output. In accordance with aspects of the subject matter disclosed herein, the executable code output can be one or more assemblies, where each assembly comprises an executable portion and a metadata portion. The metadata portion of the assembly can be used by the code generator 110 to provide information to the developer that is helpful while developing software.

In addition, system 101 can include one or more of: a metadata extractor 125 (also referred to as a metadata extracting module) and a library generator 129 (also referred to as a library generating module). Metadata extractor 125 can extract metadata 127 from server source code 114, and provide the metadata 127 extracted from the server source code 114 to library generator 129. Library generator 129 can generate one or more libraries (e.g., library 131) from the extracted metadata 127 and provide the generated library 131 to the code generator 110. The library generated from the extracted server source code can be a metadata assembly or other assembly, a DLL (dynamic link library), a package or other software library entity. The generated library can be a stripped down version of the library that includes metadata and can exclude portions of the executable part of a compilation product. For example, a library can be an executable with one or more empty method bodies. Moreover, a library can exclude private code and include portions of public code.

In turn the code generator 110 can dynamically provide information that is useful in the development of the client software from the generated library 131 to the developer of the client software during software development in the absence of compilation of the server project. The code generator 110 can provide information that is useful in the development of the client software from the generated library 131 to the developer of the client software during software development in the absence of compilation of the server source code 114 from which the metadata 127 is extracted. Metadata extractor 125 and/or library generator 129 can be loaded into memory 144 and may cause one or more processors such as processor 142 to provide library 131 generated from server source code 114 without compilation to code generator 110 to provide information useful to the developer when developing client source code 118.

Metadata extractor 125 can generate a simplified form of the server source code 114 by for example, stripping out private code and/or by stripping out method bodies. Stripping out private code and/or method bodies can increase performance (i.e., decrease the wait time of the software developer for documentation and disambiguation information to be displayed as he or she is writing the client source code in a client source code editor). That is, the time the developer would have to wait for information useful in client software development can decrease from:

the time it takes to compile the source code+the time it takes for the code generator to process the compiled binary program code to:

the time it takes the metadata extractor to extract the metadata from the source code+the time it takes the library generator to generate the library from the extracted metadata+the time it takes for the code generator to process the library to provide the documentation and disambiguation information in the client source code editor.

The time it takes the metadata extractor to extract the metadata from the source code+the time it takes the library generator to generate the metadata containing library from the extracted metadata+the time it takes for the code generator to process the metadata containing library is likely to be much less than the time it takes to compile the source code+ the time it takes for the code generator to process the compiled binary program code. Moreover, the need for compilation before code generation is eliminated so that the server source code can be in a non-compile-able state. By extracting metadata from server side source code, client proxy classes can be generated through reflection, thus providing code completion (such as but not limited to IntelliSense-type information) on server objects for client side source code development.

In accordance with aspects of the subject matter disclosed herein the server component of the application developed can expose data to a client component such as but not limited to a Silverlight client by defining one or more business objects that expose data entities. The business objects and entities defined in the server project can essentially immediately be available for the developer to write code against on the client. Accurate source reference information including IntelliSense or other code completion information can be provided essentially immediately for projects under development because compilation does not provide this information. In accordance with aspects of the subject matter disclosed herein, the mechanism by which the above is accomplished may use source code understanding techniques including custom parsers, CodeModel and other techniques to find the relevant source code (e.g., relevant types for proxy code generation).

Figure 2A:
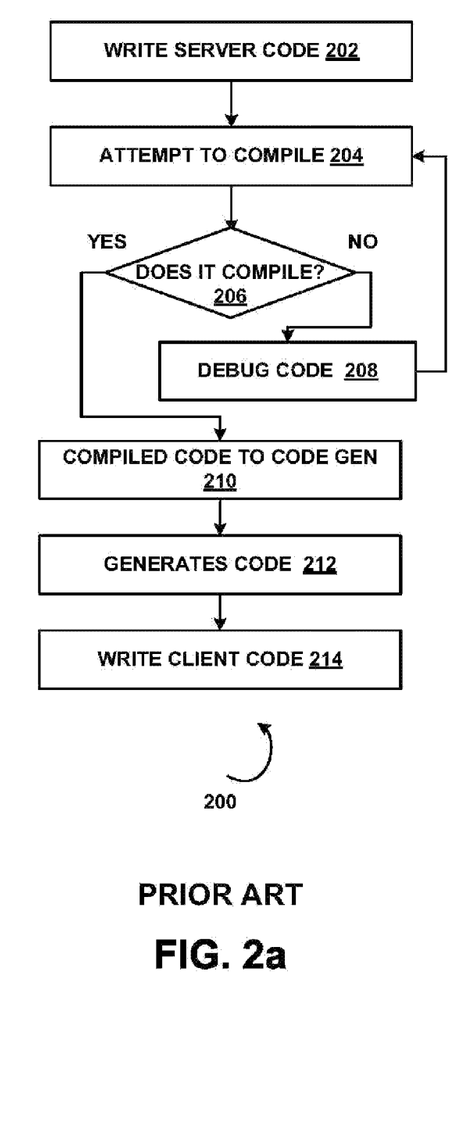
FIG. 2a is a flow diagram of a method of software development as is known in the art.

FIG. 2a illustrates a method 200 of software development as is known in the art. At 202 a developer writes server source code. At 204 the developer tries to compile the server source code. At 206, if compilation is not successful (i.e., the project has errors which prevent successful compilation,) the developer debugs the server source code at 208 and tries to compile the server source code again. At 206 if compilation is successful, (e.g., the server source code does not contain errors that prevent successful compilation) the binary program code generated by compilation is provided to the code generator or other reflection-based component at 210. At 212 the code generator generates client source code from the binary program code. At 214 the developer writes client source code.

Because information from the binary program code produced by the compilation process is available to the code generator or other reflection-based component, when the developer is writing the client source code, documentation and disambiguation information is able to be displayed to the developer. For example, statement completion information and information concerning APIs that will be exposed to the client by the server software will be available to the developer as he or she is writing the client source code. However, in order for this information to be displayed to the developer as he or she is writing the client source code in a program editor, the server project or at least the portion of the source code from which the documentation and disambiguation information was derived, has to have been successfully compiled.

Figure 2B:
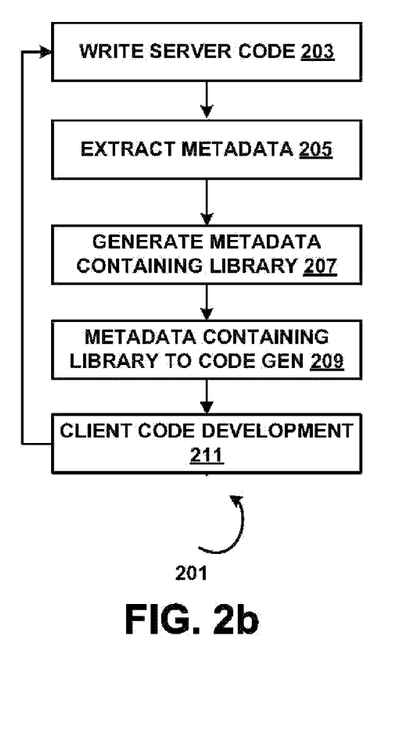
FIG. 2b is a flow diagram of an example of a method for generating libraries in the absence of project compilation in accordance with aspects of the subject matter disclosed herein.

FIG. 2b illustrates a method 201 of software development in accordance with aspects of the subject matter disclosed herein. At 203 the developer writes server source code. The server source code does not have to be in a compile-able state. That is, the server source code does not have to be complete or free of errors that prevent successful compilation. At 205 metadata is extracted from the server source code by a metadata extractor as described above with respect to FIG. 1b. At 207 the metadata extracted by the metadata extractor is used to generate a stripped down library such as but not limited to a metadata assembly as described above. At 209 the library is received by the code generator or other reflection-based component. The code generator or other reflection-based component can generate client source code such as proxy APIs for APIs that are exposed to the client. At 211 documentation and disambiguation information can be displayed to the developer as he or she is writing the client source code. The documentation and disambiguation information displayed in the source code editor derives from the code generator generated client source code derived from the stripped down library (generated in the absence of project compilation) derived from the extracted server source code. At this point, the developer can choose to write more server code at 203 or continue to write more client code.

Example of a Suitable Computing Environment

Figure 3:
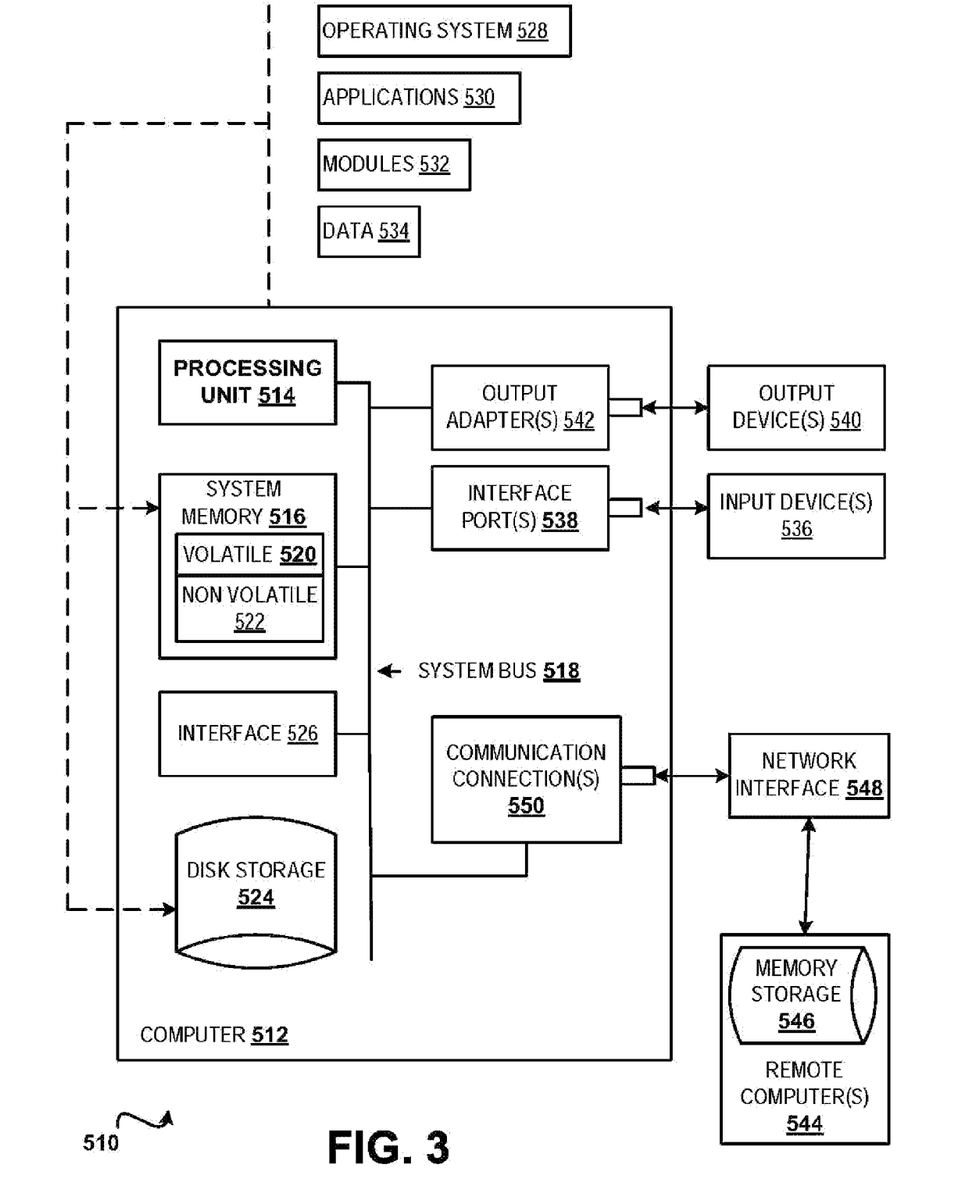
FIG. 3 is a block diagram illustrating an example of a computing environment in which aspects of the subject matter disclosed herein may be implemented.

In order to provide context for various aspects of the subject matter disclosed herein, FIG. 3 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device for generating libraries for reflection without project compilation in the form of a computer 512 is described. Computer 512 may include a processing unit 514, a system memory 516, and a system bus 518. The processing unit 514 can be any of various available processors. Dual microprocessors and other multi-processor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 512.

It will be appreciated that FIG. 3 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
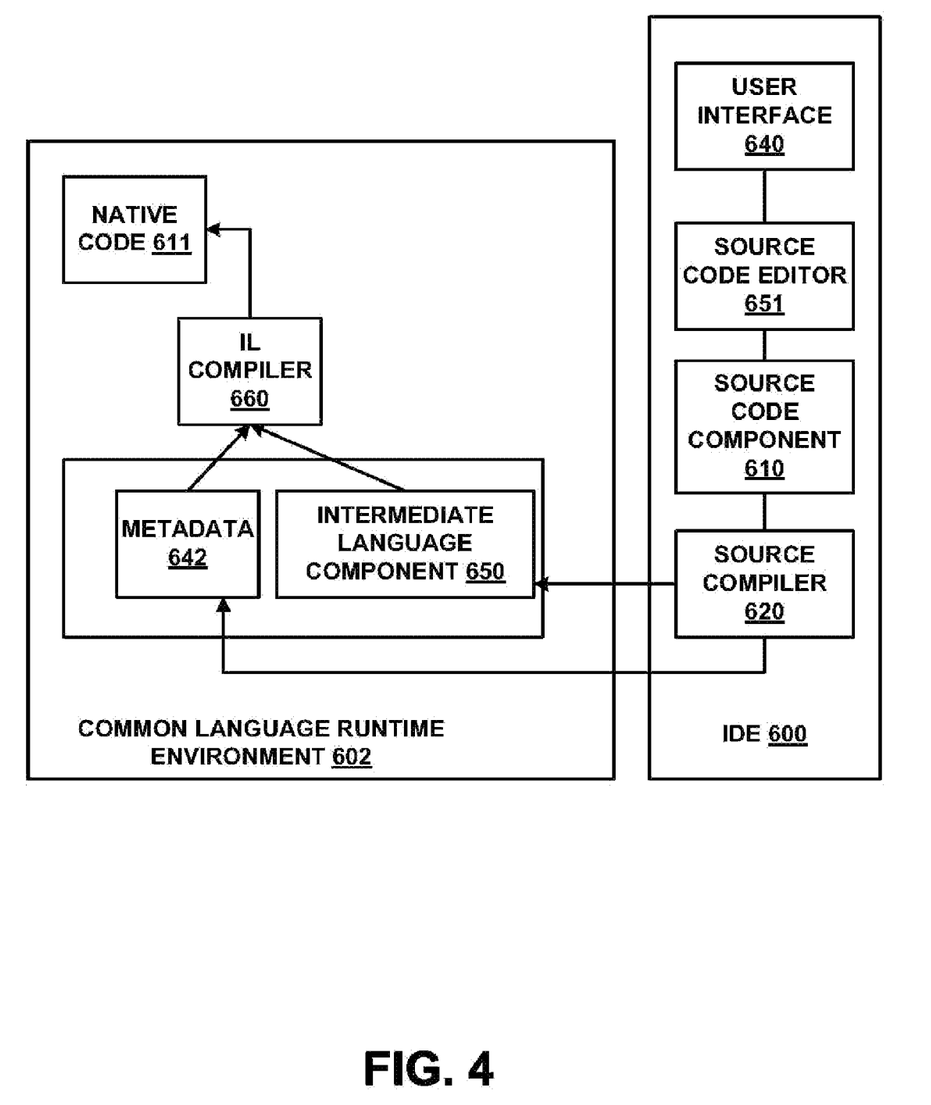
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory including a library generating module configured to cause the processor to:
receive metadata extracted from server source code in a server project of an application comprising at least the server project and at least one client project;
generate a library from the extracted metadata without compilation of the server project, wherein the library comprises metadata associated with at least one program entity exposed to a client and wherein the library does not comprise metadata associated with program entities not exposed to the client; and
provide the generated library to a reflection-based component that provides documentation and disambiguation information for the at least one program entity to a client source code editor, wherein the documentation and disambiguation information is provided to the client source code editor dynamically during development of client source code of the at least one client project.

2. The system of claim 1, wherein the documentation and disambiguation information for the at least one program entity comprises at least at least one function, at least one method or at least one type exposed to the client.

3. The system of claim 1, wherein the processor generates source code for the at least one client project, wherein the generated source code comprises at least one proxy API for at least one API exposed by a server via the application to the client.

4. The system of claim 1, wherein the library comprises a metadata assembly comprising executable code with empty method bodies.

5. The system of claim 1, wherein the application is a network application comprising the server project and the at least one client project, wherein server software generated from the server project exposes at least one API to client software generated from the at least one client project.

6. The system of claim 1, wherein the reflection-based component generates at least one proxy API from the library, the library comprising at least one proxy class.

7. The system of claim 6, wherein the at least one proxy API generated from the library comprising the at least one proxy class is displayed in the client source code editor during client source code development, wherein the at least one proxy API is generated from the library generated from the metadata extracted from the server source code without compilation of the server project.

8. A method comprising:
extracting metadata from server-side source code of a server project of an application under development on a software development computer, the application comprising server-side software generated from the server-side source code and client-side software generated from client-side source code, wherein the extracted metadata comprises metadata associated with at least one program entity, wherein the at least one program entity is exposed by the server-side software to the client-side software on the software development computer and wherein the extracted metadata does not comprise a program entity that is not exposed to the client-side software by the server-side software, and wherein a metadata extracting module extracting the metadata executes on the software development computer;
generating a library from the extracted metadata without compilation of the server project, wherein the library comprises metadata associated with the at least one program entity exposed to the client running the client-side software and does not comprise an executable;
receiving the generated library and generating client-side source code documentation and disambiguation information associated with the at least one program entity from the generated library by reflection; and
displaying the documentation and disambiguation information in a client-side source code editor dynamically during client-side source code development.

9. The method of claim 8, wherein development of the client-side source code and development of the server-side source code proceed in tandem.

10. The method of claim 8, wherein the documentation and disambiguation information is displayed without compilation of the server project and comprises at least one variable, at least one function, at least one method or at least one API exposed to the client running the client-side software.

11. The method of claim 8, wherein the documentation and disambiguation information is displayed without compilation of the server project and comprises a list of APIs exposed to the client running the client-side software by the server running the server-side software.

12. The method of claim 8, further comprising:
providing the generated library to a reflection-based component comprising a code generator, wherein the reflection-based component generates client source code for at least one client project of the application from the generated library.

13. The method of claim 8, further comprising:
extracting source code from the server project, the extracted source code comprising at least one proxy class that exposes an API to the client running the client-side software.

14. The method of claim 8, wherein the at least one program entity comprises a class, a type, a method, a function, a field or a property that is exposed to the client or a variable.

15. A computer-readable storage medium comprising computer-executable instructions which when executed cause at least one processor to:
extract metadata from server-side source code of a server project of an application under development, wherein the extracted metadata comprises at least one server-side program entity exposed to a client-side project by the server project and wherein the extracted metadata does not comprise a program entity that is not exposed to the client-side project;
convert the extracted metadata to a library, wherein the library comprises a metadata assembly comprising an executable with an empty method body, without compiling the server-side source code; and
display documentation and disambiguation information associated with the exposed program entity derived from the library in a source code editor during development of client-side source code for the application.

16. The computer-readable storage medium of claim 15, comprising further computer-executable instructions, which when executed cause the at least one processor to:
extract the metadata based on language constructs, wherein private code is not extracted.

17. The computer-readable storage medium of claim 15, comprising further computer-executable instructions, which when executed cause the at least one processor to:
receive the library and generate client-side source code documentation and disambiguation information from the library.

18. The computer-readable storage medium of claim 15, comprising further computer-executable instructions, which when executed cause the at least one processor to:
generate client-side source code for a client project of the application, wherein the generated client-side source code comprises at least one proxy API.

19. The computer-readable storage medium of claim 15, comprising further computer-executable instructions, which when executed cause the at least one processor to:
provide the documentation and disambiguation information to a source code editor in which the client-side source code is being developed before the server-side software is successfully compiled.

20. The computer-readable storage medium of claim 19, comprising further computer-executable instructions, which when executed cause the at least one processor to:
provide the documentation and disambiguation information by reflection on the library generated from the metadata extracted from the server-side source code, wherein the library is generated without compilation of the server-side source code from which the metadata was extracted.

* * * * *

UNITED STATES PATENT AND TRADEMARK OFFICE
CERTIFICATE OF CORRECTION

PATENT NO.         : 8,239,823 B2                                    Page 1 of 1
APPLICATION NO.    : 12/408329
DATED              : August 7, 2012
INVENTOR(S)        : Stenberg et al.

It is certified that error appears in the above-identified patent and that said Letters Patent is hereby corrected as shown below:

In the Claims

Column 10, line 64, Claim 2, after "at least" delete "at least".

Signed and Sealed this
Tenth Day of February, 2015

Michelle K. Lee
*Deputy Director of the United States Patent and Trademark Office*